Aug. 14, 1923.
1,464,691
G. L. BAYLEY
TRANSMISSION
Filed May 24, 1922
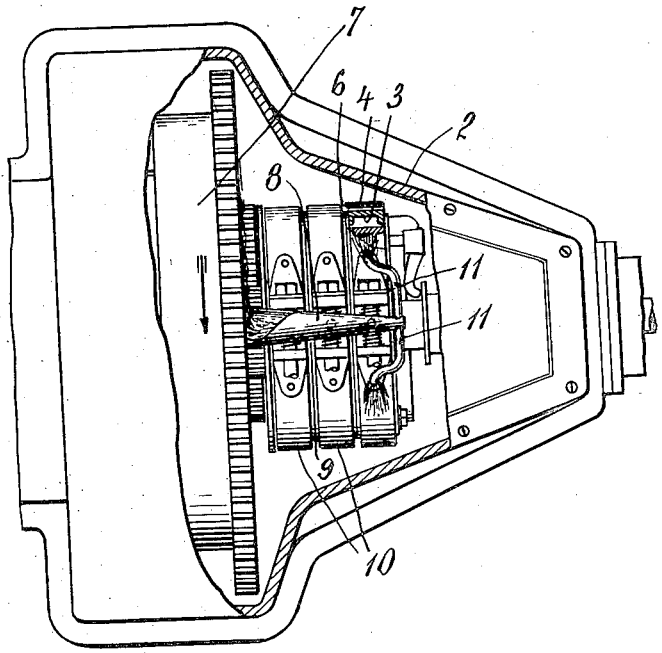
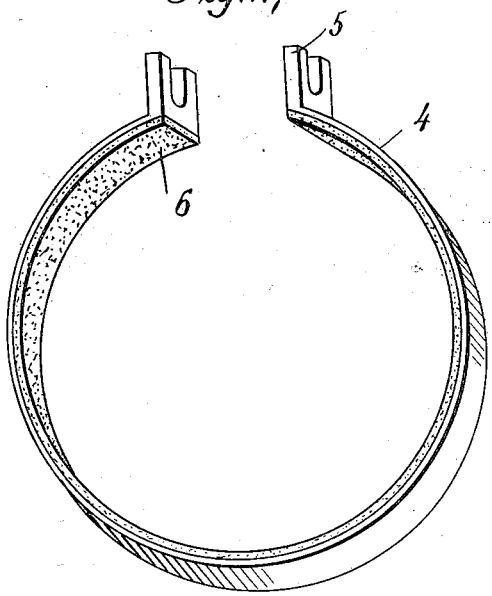
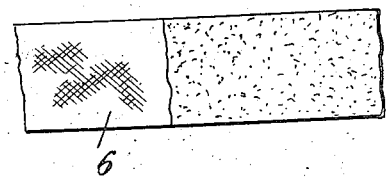
INVENTOR
G. L. Bayley
BY
ATTORNEYS Patented Aug. 14, 1923.

1,464,691

UNITED STATES PATENT OFFICE.

GUY L. BAYLEY, OF CHAPPAQUA, NEW YORK.

TRANSMISSION.

Application filed May 24, 1922. Serial No. 563,244.

*To all whom it may concern:*

Be it known that I, GUY L. BAYLEY, a citizen of the United States, residing at Chappaqua, in the county of Westchester, State of New York, have invented certain new and useful Improvements in Transmissions; and I do hereby declare the following to be a full, clear, and exact description of the invention, such as will enable others skilled in the art to which it appertains to make and use the same.

My invention is an improvement in transmissions of the planetary type such as are commonly used on low-priced motor cars, and relates particularly to the construction and arrangement of the braking mechanism.

In these transmissions, a large amount of heat is generated during the application of the brakes, by the friction between the drum and the brake band or strap. Such heat is generated quickly and at the periphery of the drum resulting in temperatures sufficiently high to cause the oil to carbonize on the brake linings and form a glaze. Due to this glaze the retarding action of the brake lining is not uniform and constant, such as would result in a smooth and gradual slowing of the drum's rotation. The parts incline to stick or "seize," with consequent disagreeable jerking of the body, and excessive strains to the mechanism of the car. This condition of affairs is recognized, and attempts have been made to cure it, by arranging the drum to operate in a bath of oil thereby to lubricate and cool the parts, and by facing the band or strap with a material that will not heat readily by friction. However, as only that portion of the drum as is exposed between the lugs 5 of the brake band is subjected to the flow of the cooling oil, the amount of heat carried away in this manner is very limited. The periphery which is the part to be cooled, is protected to a large extent by the brake band, and the material of the band does not readily conduct the heat from the engaging face to the free face thereof. Hence the cooling and lubricating action is far from satisfactory.

In the present invention I provide a transmission wherein the facing is an excellent conductor of heat, rapidly transferring the friction generated heat from the periphery of the drum to the free face of the band, where it is absorbed and removed, and I also provide a band which is self-lubricating insuring at all times a smooth working of the parts upon each other. Thus I eliminate the liability to overheating and glazing, with consequent sticking of the parts, and I insure a steady, uniform, efficient drag upon the drum, when the brake is applied.

In the drawings;

Figure 1 is a plan view of a portion of a Ford transmission, with parts broken away, Figure 2 is a perspective view of the brake band detached, Figure 3 is a plan view with parts broken away, of a portion of the facing for the band.

In the present embodiment of the invention, the transmission indicated generally at 1, and arranged within the usual casing 2, includes a brake drum 3, with which cooperates a brake band 4. This band, which is of metal, and has radial lugs 5, for engagement by operating means of usual construction whereby to tighten the band on the drum, is faced with a lining 6 of fabric material, the said material being usually of cotton, since cotton has been found to be most suitable for the purpose.

The lining of fabric material increases the friction between the band and the drum, but the lining is a poor conductor of heat, and the heat generated by contact between the band and the drum is not readily conducted to the band, where it could be dissipated. The casing 2 contains oil, and this oil has been utilized to lubricate the parts of the transmission, the oil which is carried up on the face of the flywheel indicated at 7, being diverted onto the top of the brake drum. For this purpose a funnel shaped collector 8 is secured in fixed position at the top of the transmission, just above the brake drum 3, and the drums 9 of the transmission. This collector collects the oil from the face of the flywheel, and distributes it on to the brake drum, between the lugs of the band 4 of the brake band, and onto the transmission drums 9. The brake band 4 shields and protects the periphery of the brake drum 3, so that there is but little lubrication of the contacting surfaces of the band and drum, and very little cooling. The contact between the periphery of the drum and the oil is slight. Furthermore, the lining 6 does not readily conduct the heat to the metal band 4, so that the transfer of heat is relatively small. To overcome the various difficulties which I have pointed out, I have provided a brake band lining which has a high heat conductivity. This band I also make self-lubricating, and I accomplish these results by completely and uniformly impregnating the band with graphite.

I have found that it is possible to carry on this impregnation satisfactorily only by the use of graphite in the colloidal form, commonly termed "deflocculated" graphite. By using graphite in this highly sub-divided condition the complete and uniform impregnation of the textile material which forms the band may be obtained. Graphite in the powder or flake form is not satisfactory since the fibres of the material, such, for instance, as cotton, ordinarily used for brake band linings, have a tendency to filter out the graphite particles from the impregnating medium. By using colloidal graphite, however, the textile material is completely and uniformly impregnated and thereby acquires a degree of heat conductivity which it is impossible to obtain with other forms of graphite.

The impregnation process is carried on with the use of oil in which the colloidal graphite is suspended. This oil is heated to a relatively high temperature, so as to increase its viscosity, and the fabric is placed in the oil. The continued heating of the oil serves to drive out the air among the textile fibres and the graphite particles enter. The graphite will thus uniformly and completely impregnate the fabric.

It is not necessary, though preferable, that the medium should be oil, since colloidal graphite may be readily suspended in water or other fluid media and a complete and uniform impregnation secured.

The textile material treated in the manner described is thereby made a good thermal conductor so that it transfers heat readily from the periphery of the drum to the metal portion of the band encasing the lining. In addition the graphite serves for lubricating purposes, thus preventing the lining from becoming glazed and so maintaining the efficiency of the brake.

In order to assist in the cooling action I provide the oil collector 8 with lateral branches 11 overlying the brake band. These branches deliver oil on either side of the lugs 5, directly on the exposed face of the band. The oil so delivered tends to absorb the heat which is conducted from the drum to the metal band by means of the lining, and so keeps the temperature of the band relatively low. As has previously been explained, in the ordinary type of brake the oil is delivered to the face of the drum only over that small exposed area between the lugs 5, and is not particularly effective in keeping the temperature down. In the present case however, I have provided a conducting lining which transmits heat from the entire periphery of the drum with the exception of the part lying between the lugs 5, and this heat is dissipated by means of the cooling oil flowing over the face of the metal band.

With the improved lining the action of the band on the drum is smooth and the band does not have a tendency to stick, thereby eliminating jerking and chattering. This effect is brought about primarily by the increased thermal conductivity of the lining, which keeps the temperature so low as to prevent hardening or glazing of the fabric, and also by the lubricating qualities of the impregnated graphite.

I claim:
1. A brake band lining consisting of a textile fabric impregnated with colloidal graphite.
2. A brake band lining consisting of a textile fabric having colloidal graphite uniformly distributed therethrough.
3. In a brake mechanism, a brake band having a lining or facing of fabric material uniformly impregnated with colloidal graphite to increase the heat conductivity of the band and to provide lubrication, and means for discharging oil upon the free face of the band.
4. In a brake mechanism, a brake band having a lining or facing of fabric material impregnated with colloidal graphite to increase the heat conductivity of the band and to provide lubrication, and means for discharging oil upon the free face of the band, said means comprising a collector adjacent to the flywheel delivering onto the free face of the band.

In testimony whereof I affix my signature.

GUY L. BAYLEY.